_US005215786A_

United States Patent [19]

Kittle

[11] Patent Number: 5,215,786
[45] Date of Patent: * Jun. 1, 1993

[54] COMPOSITION FOR PROVIDING A FOAM BARRIER BETWEEN A SUBSTRATE AND THE ATMOSPHERE AND THE METHOD OF USE

[75] Inventor: Paul A. Kittle, Corcordville, Pa.

[73] Assignee: Rusmar Incorporated, West Chester, Pa.

[*] Notice: The portion of the term of this patent subsequent to Mar. 17, 2009 has been disclaimed.

[21] Appl. No.: 747,618

[22] Filed: Aug. 20, 1991

[51] Int. Cl.$^5$ .................. B01J 13/00; B01J 19/16; B05D 7/24; C09K 3/32
[52] U.S. Cl. .................. 427/244; 47/2; 252/3; 252/8.05; 252/307; 252/354; 252/382; 422/42; 405/128; 405/129
[58] Field of Search .................. 252/3, 307, 354, 382, 252/109, 114; 405/128, 129; 427/244; 422/42

[56] References Cited

U.S. PATENT DOCUMENTS

| | | | |
|---|---|---|---|
| 1,985,491 | 12/1934 | Fisher | 422/42 |
| 2,167,180 | 7/1939 | Kritchevsky | 252/112 X |
| 2,748,078 | 7/1956 | Perri et al. | 252/8.05 |
| 2,758,969 | 8/1956 | Perri et al. | 252/3 |
| 2,945,322 | 7/1960 | Gaeth et al. | 47/9 |
| 3,156,655 | 11/1964 | Bright | 252/109 |
| 3,396,112 | 8/1968 | Burrows | 252/62 |
| 3,466,873 | 9/1969 | Present | 405/128 |
| 3,541,581 | 11/1970 | Monson | 252/307 |
| 3,713,404 | 1/1973 | Lavo et al. | 252/307 X |
| 3,954,662 | 5/1976 | Salyer et al. | 252/382 |
| 3,956,138 | 5/1976 | Crockett | 252/3 |
| 4,050,944 | 9/1977 | Cartwright | 106/19 |
| 4,085,059 | 4/1978 | Smith et al. | 252/307 X |
| 4,118,526 | 10/1978 | Gregorian et al. | 427/350 |
| 4,342,665 | 8/1982 | Itoh et al. | 252/3 X |
| 4,417,016 | 11/1983 | Cline et al. | 524/156 |
| 4,421,788 | 12/1983 | Kramer | 427/136 |
| 4,442,018 | 4/1984 | Rand et al. | 252/307 |
| 4,519,338 | 5/1985 | Kramer et al. | 118/305 |
| 4,528,039 | 7/1985 | Rubin et al. | 252/135 X |
| 4,533,490 | 8/1985 | Kluth et al. | 252/307 X |
| 4,610,311 | 9/1986 | Bronner et al. | 169/45 |
| 4,663,069 | 5/1987 | Llenado | 252/307 X |
| 4,849,117 | 7/1989 | Bronner et al. | 252/3 |
| 4,874,641 | 10/1989 | Kittle | 427/244 |
| 4,990,373 | 2/1991 | Kittle | 427/244 |
| 5,096,616 | 3/1992 | Kittle | 252/307 |

FOREIGN PATENT DOCUMENTS 154997 12/1982 India.

OTHER PUBLICATIONS

Chem. Abs., vol. 51:10928h "Properties of Solutions of Mixtures of Alkylbenzene Sulfonate and Soap", Nevolin et al., 1957.

Primary Examiner—Richard D. Lovering
Attorney, Agent, or Firm—Howson & Howson

[57] ABSTRACT

A composition for forming an essentially biodegradable foam for application to a substrate to provide a barrier between the substrate and the atmosphere formulated from a mixture in water of specified materials in certain proportional relationships. Its use in preparing such a foam barrier is also provided.

26 Claims, No Drawings

COMPOSITION FOR PROVIDING A FOAM BARRIER BETWEEN A SUBSTRATE AND THE ATMOSPHERE AND THE METHOD OF USE

The present invention relates to a novel composition especially adapted to generate an improved foam barrier layer between a substrate and the atmosphere and to the method of using the composition More particularly, the present invention relates to such a composition that may be manufactured, transported, stored and handled as a concentrate and which, upon dilution with water, can be converted to a foam of exceptional thickness and persistence.

BACKGROUND OF THE INVENTION

In my prior U.S. Letters Pat. No. 4,874,641 are disclosed compositions for generating foam adapted to form an inexpensive, temporary barrier layer between a substrate, such as a layer of waste deposited in a landfill, and the atmosphere. As pointed out in the patent, such a barrier layer might serve to protect the atmosphere from deleterious materials which would escape from the substrate, such as odors and blowing trash from landfills, dust or noxious fumes from spills, and the like. As also pointed out in the patent, such a barrier layer might also serve to protect the substrate from adverse conditions in the atmosphere, as in protecting growing fruit, vegetables and plants from unseasonal frost. It might be added, in connection with the latter situation, that such a foam, particularly one prepared according to the present invention, might be used in the control of mine fires, specifically abandoned mine fires, where the foam can be pressure injected underground. In this application, the foam would serve four fundamental functions: (1) displacement of combustion air and gases which are products of combustion; (2) extinguishment of the actively burning zones; (3) heat removal from the surrounding strata; and (4) deposition of known chemical fire fighting ingredients (urea for instance) in order to minimize problems associated with reignition.

U.S. Pat. Nos. 4,421,788 and 4,519,338 relate to using a hardenable plastic foam to replace the daily compacted earth cover on a landfill. The foam employed according to these patents is prepared using a foaming agent and a liquid synthetic resin, such as a precondensate of urea and formaldehyde. U.S. Pat. No. 4,421,788 describes covering successive layers of refuse with foamed polyurethane, polyether or polyester-based resins.

Since the development of the foam composition of my prior patent, certain state governmental agencies have promulgated regulations governing sanitary landfills and the like with more stringent requirements. For example, there is a requirement that the sanitary landfill daily cover foam be six inches thick in addition to satisfying all other conventional requirements. Among the latter are the requirement that the cover be effective in sealing off of odors from, and in preventing insects from gaining access to, the waste, while being innocuous to the environment. The foam generated from the composition as disclosed in my prior patent was not stiff enough to "stack" six inches thick, especially on a slope and at low temperatures.

The foam-generating composition must be capable of being produced, transported, stored and handled as a concentrate in order to avoid the handling of large volumes of liquid which is mostly water. The concentrate, of course, is subjected to widely different atmospheric temperature conditions, including very low temperatures. Attempts at modifications of the prior foaming composition to meet the new technical and regulatory requirements led to other problems.

There are conflicts between soluble/insoluble characteristics of combinations of components in a foam-generating composition. Potassium soaps are generally much more soluble in water than sodium soaps, and higher molecular weight fatty acids, like palmitic and stearic, give more dense, more stable foams than lower molecular weight homologs. Yet, in order to obtain the stiffness and drain time performance (foam persistence), it is desirable to have the foam in the "insoluble" mode, while, on the other hand, in order to provide a foaming composition in the form of a concentrate, the materials should be in a "soluble" mode so that active ingredients are not precipitated and lost to the system. Solubility is also important to the ultimate foaming performance. It is generally accepted that soaps foam well in hot water, foam moderately in room temperature water and do not foam in cold water. Yet foams of the type to which the present invention is directed are generally applied under ambient temperature conditions ranging from below freezing, at the low end, to 90°–100° F. at the high end.

OBJECTS OF THE INVENTION

It is, therefore, the principal object of the present invention to provide new and improved foam-producing compositions for forming a barrier between a substrate and the atmosphere.

It is another object of the present invention to provide a novel foam-producing composition adapted to be produced, transported, stored and handled as a concentrate, even at very low ambient atmospheric temperatures, while being capable, upon dilution with water, of generating a foam meeting the technical and regulatory criteria.

It is a further object of the present invention to provide a novel method of producing a foam barrier layer between a substrate and the atmosphere utilizing the novel composition.

These and other objects will become apparent from a consideration of the following specification and claims.

SUMMARY OF THE INVENTION

The composition of the present invention, for forming a biodegradable foam for application to a substrate to provide a barrier between the substrate and the atmosphere, is formulated from a mixture in water of:

(A) a sodium sulfonate having the formula

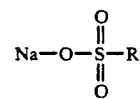

where R is an alkyl, alkylene or alkaryl group containing from 10 to 20 carbon atoms; (B) a carboxylic acid $R_1COOH$ where $R_1$ is an alkyl group containing 8 to 30 carbon atoms; (C) potassium hydroxide; (D) potassium silicate, the proportion of C plus D to B being sufficient for substantially complete neutralization to form the potassium salt of B and the proportion of B to A providing a mol ratio of B to A greater than 1:1 and up to about 2:1; (E) a non-ionic, solid, organic, water-soluble material such as sucrose or urea, and (F) a hydroxylic solvent for the potassium salt of B. Where hard water is encountered, a water conditioner (G) such as potassium tripolyphosphate can be included.

DESCRIPTION OF THE PREFERRED EMBODIMENTS

In the above-described composition, each of the components plays an important role in providing the overall characteristics of the final foam as well as the concentrated and diluted forms of the composition. These roles will be referred to below in connection with the discussion of each of the components. In addition, the composition is the result of mixing components (A) through (F) in water so that, in the resulting composition, the identity of certain of the components as such may be lost through, for example, ion interchange and neutralization.

Component A is a sodium sulfonate having the defined formula. It is the surfactant foaming agent. Preferably, A is a sodium alphaolefin sulfonate containing from 10 to 20 carbon atoms, especially a mixture containing principally 14 and 16 carbon atoms.

Carboxylic acid (component B) provides, upon neutralization to its potassium salt, the soap foaming agent. Preferably, $R_1$ is a straight chain alkyl group containing from 8 to 20 carbon atoms, especially stearic and palmitic acids. In such a mixture, the relative proportions of stearic acid to palmitic acid may be between about 45 and about 55%, by weight, of the former to between about 55 and about 45%, by weight, of the latter, preferably about 50:50.

To form the desired potassium ion content, two sources are employed: component C, potassium hydroxide, and component D, potassium silicate. For example, silicate is required for minimization of carboxylic acid salt precipitation. However, if potassium silicate is used as a source of neutralizing potassium ion, precipitation of a complex silicate occurs. As stated above, the proportion of C plus D to carboxylic acid (B) is sufficient for substantially complete neutralization to form the potassium salt of B. However, the proportion of C to D will be such as to provide between about 50% to 90% of the potassium base from the potassium hydroxide (C) and about 50% to 10% of the potassium base from the potassium silicate (D). The preferred mole ratio is 4 moles of potassium base from the potassium hydroxide (C) to 1 mole of potassium base from the potassium silicate (D).

To enhance the stiffness of the resulting foam by increasing the solids content without upsetting the ionic equilibrium of the composition, a solid, non-ionic water soluble material, such as sucrose or urea (component E) is included. Sucrose is preferred on the basis of drain time, concentrate physical properties and foam stiffness.

At very low temperatures, the viscosity of the composition comprising components A through E may still present problems. The viscosity of the concentrate even at 30°-40° C. is higher than desired for ease in production, transportation, storage and handling, and the risk of solidification upon further decline in temperature is high. The viscosity of the concentrate is preferably about 200-300 cps at 30° C. so that it can be handled easily in a bulk storage/dilution system. Hence, there is included component F, a solvent for the potassium salt of carboxylic acid (B). This will generally be a hydroxylic solvent such as methanol, isopropanol, ethylene glycol, propylene glycol, glycol ethers and the like. Of these, the glycol ethers are preferred, especially ethylene glycol monobutyl ether and diethylene glycol monobutyl ether, particularly the latter.

The degree of hardness of the water used to produce the composition, both concentrate and diluted form, can have and effect on the persistence and quality of the resulting foam. Hence, in order to accommodate water of various degrees of hardness from differing sources available, a hardness control agent, component G, can be included. Hardness control agents such as ethylene diamine tetraacetic acid or potassium phosphates can be used, but potassium tripolyphosphate, a known dispersing agent, is preferred because it improves the physical characteristics of the concentrate. In the preparation of the concentrate, the hardness control agent (G) is preferably added to the water immediately following the addition of the sodium alphaolefin sulfonate (A).

Reference has been made above to proportional relationships among certain of the components. In general the proportions of the components, on a water-free basis and in terms of percent by weight based on the combined weight of components A through F are: (A) from about 15 to about 20%, preferably about 18-19%; (B) from about 25 to about 35%, preferably about 30-32%; (C) from about 2 to about 8%, preferably about 5-6%; (D) from about 2 to about 5%, preferably about 3-4%; (E) from about 15 to about 30%, preferably about 23-24%, and (F) from about 10 to about 15%, preferably about 13-14%.

In the preferred concentrate, potassium tripolyphosphate (G) is also included in an amount between about 3 and 7%, preferably about 5-6%, based on the combined weight of the components A-G.

Reference has also been made to preparation of the composition as a concentrate with subsequent dilution with water, usually at the site of use, for foam generation. The concentrate may have a concentration of components A through F by weight on a water-free basis of between about 10 and about 40%, preferably about 23 to 31%, based on the total weight of the concentrate. For generation of foam such concentrate may be diluted with about 7 to about 9 volumes of water per volume of concentrate to provide a concentration of components A through F by weight on a water-free basis of between about 1 and about 6%, preferably about 3 to 4%, based on the total weight of the diluted composition.

Foam is generated from the diluted composition by agitation in the presence of air. One apparatus for this purpose forces the foamable mixture through a restricted passage at a high pressure and injects air into the composition downstream of the restriction. The foam may then be sprayed onto the substrate through a nozzle.

The invention may be more readily understood from a consideration of the following specific example which is given for the purpose of illustration only and is not intended to limit the scope of the invention in any way.

EXAMPLE

To room temperature water are added in sequence: (1) sodium alphaolefin sulfonate (a commercial grade containing principally 14 and 16 carbon atoms); (2) sugar (sucrose), and (3) diethylene glycol monobutyl ether. The mixture is heated to 45° C. and the remaining materials are added in sequence: (4) potassium hydroxide; (5) potassium silicate (a commercial grade, "Kasil #1" manufactured by PQ Corporation of Valley Forge, Pa.), and (6) a commercial mixture (about 50:50) of stearic and palmitic acids ("Hystrene 5016" manufactured by Witco, Humko Division). Heating is continued until solution is complete. The amounts are shown in the following table.

| MATERIAL | PARTS BY WEIGHT ASSOCIATED | | |
|---|---|---|---|
| | SOLIDS | WATER | TOTAL |
| 1. sodium alpha olefin sulfonate | 1426 | 2138 | 3564 |
| 2. sugar (sucrose) | 1782 | | 1782 |
| 3. diethylene glycol monobutyl ether | 990 | | 990 |
| 4. potassium hydroxide | 396 | 484 | 880 |
| 5. potassium silicate | 287 | 703 | 990 |
| 6. stearic/palmitic acids | 2376 | | 2376 |
| water | | 11418 | 11418 |
| TOTAL | 7257 | 14743 | 22000 |

This concentrate may be transported, stored and handled at temperatures above about 25° C. For generation of foam, it is diluted with eight volumes of water per volume of concentrate.

The diluted concentrate can be foamed using a pneumatic foam unit of the kind described in U.S. Pat. No. 4,474,680, dated Oct. 2, 1984. The foam is discharged from the foam unit onto the working face of a sanitary landfill at a thickness preferably exceeding six inches. This is believed to be the maximum foam layer thickness required in the United States. The foam exhibits no cold flow, and only very slight contraction overnight. If deposited in the late afternoon or early evening at a thickness in the range of 6 to 7 inches, the foam layer will normally have a thickness of around 5 to 6 inches in the morning. The foam is very stiff, but does not dry to a dust as do typical more ionic foams, including fire-fighting foams. Foam performance is best where warm water (>30° C.) is used for dilution, but declines only slightly as the temperature of the diluent water approaches freezing.

Various modifications can be made to the composition described herein. For example additional ingredients can be included in the composition, such as small quantities of carbon black (up to 2% of the weight of the concentrate). The composition and can be modified in various other respects without departing from the scope cf the invention as defined in the following claims.

I claim:

1. A composition for forming a biodegradable foam for application to a substrate to provide a barrier between the substrate and the atmosphere, formulated from a mixture in water of: (A) a sodium sulfonate having the formula

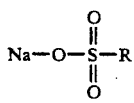

where R is an alkyl, alkylene or alkaryl group containing from 10 to 20 carbon atoms; (B) a carboxylic acid $R_1COOH$ where $R_1$ is an alkyl group containing from 8 to 30 carbon atoms; (C) potassium hydroxide; (D) potassium silicate, the proportion of C plus D being sufficient for substantially complete neutralization to form the potassium salt of B, and the proportion of B to A providing a mol ratio of B to A greater than 1:1 and up to about 2:1; (E) a non-ionic, solid, organic, water-soluble material; and (F) a hydroxylic solvent for the potassium salt of B.

2. The composition of claim 1 wherein A is a sodium alphaolefin sulfonate containing from 10 to 20 carbon atoms; wherein $R_1$ in B is a straight chain alkyl group; wherein E is sucrose; wherein F is a glycol ether, and wherein the mol ratio of potassium provided by C plus D to sodium provided by A is about 2:1.

3. The composition of claim 2 wherein the mol ratio of B to A is about 2:1, and wherein the proportions of the components, on a water-free basis, are: A from about 15 to about 20%, B from about 25 to about 35%, C from about 2 to about 8%, D from about 2 to about 5%; E from about 15 to about 30%; and F from about 10 to about 15%, said percentages being by weight based on the combined weight of components A through F on a water-free basis.

4. The composition of claim 2 wherein the mol ratio of B to A is about 2:1, and wherein the proportions of the components, on a water-free basis, are: A from about 18-19%, B about 30-32%; C about 5-6%; D about 3-4%; E about 23-24%; and F about 13-14%, said percentages being by weight based on the combined weight of components A through F on a water-free basis.

5. The composition of claim 1 wherein A is a sodium alphaolefin sulfonate which is a mixture containing principally 14 to 16 carbon atoms; wherein B is a mixture of stearic and palmitic acids; wherein E is sucrose; wherein F is diethylene glycol monobutyl ether, and wherein the mol ratio of potassium provided by D plus D to sodium provided by A is about 2:1.

6. The composition of claim 5 wherein the mol ratio of B to A is about 2:1, and wherein the proportions of the components, on a water-free basis, are: A from about 15 to about 20%; B from about 25 to about 35%; C from about 2 to about 8%; D from about 2 to about 5%; E from about 15 to about 30%; and F from about 10 to about 15%, said percentages being by weight based on the combined weight of components A through F on a water-free basis.

7. The composition of claim 5 wherein the mol ratio of B to A is about 2:1, and wherein the proportions of the components, on a water-free basis, are : A about 18–19%, B about 30–32%, C about 5–6%; D about 3—4%, E about 23–24%; and F about 13–14%, said percentages being by weight based on the combined weight of components A through F on a water-free basis.

8. The composition of claim 1 wherein the mol ratio of B to A is about 2:1, and wherein the proportions of the components, on a water-free basis, are: A from about 15 to about 20%; B from about 25 to about 35%; C from about 2 to about 8%; D from about 2 to about 5%; E from about 15 to about 30%; and F from about 10 to about 15%, said percentages being by weight based on the combined weight of components A through F on a water-free basis.

9. The composition of claim 1 wherein the mol ratio of B to A is about 2:1, and wherein the proportions of the components, on a water-free basis, are : A about 18–19%, B about 30–32%, C about 5–6%; D about 3—4%, E about 23–24%; and F about 13–14%, said percentages being by weight based on the combined weight of components A through F on a water-free basis.

10. The composition of claim 1 in the form of a concentrate having a concentration of components A through F by weight on a water-free basis of between about 10 and about 40% based on the total weight of the concentrate.

11. The composition of claim 1 in the form of a concentrate having a concentration of components A through F by weight on a water-free basis of between about 23 and about 31% based on the total weight of the concentrate.

12. The composition of claim 1 wherein E is sucrose or urea.

13. The composition of claim 1 including potassium tripolyphosphate.

14. The method of forming a barrier layer between a substrate and the atmosphere which comprises applying to the substrate a biodegradable foam generated from an aqueous composition formulated from a mixture comprising:

(A) a sodium sulfonate having the formula

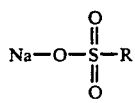

where R is an alkyl, alkylene or alkaryl group containing from 10 to 20 carbon atoms; (B) a carboxylic acid $R_1COOH$ where $R_1$ is an alkyl group containing from 8 to 30 carbon atoms; (C) potassium hydroxide; (D) potassium silicate, the proportion of C plus D to B being sufficient for substantially complete neutralization to form the potassium salt of B and the proportion of B to A providing a mol ratio of B to A greater than 1:1 and up to about 2:1; (E) a non-ionic, solid, organic, water-soluble material; and (F) a hydroxylic solvent for the potassium salt of B.

15. The method of claim 14 wherein A is a sodium alphaolefin sulfonate containing from 10 to 20 carbon atoms; wherein $R_1$ in B is a straight chain alkyl group; wherein E is sucrose; wherein F is a glycol ether; and wherein the mol ratio of potassium provided by C plus D to sodium provided by A is about 2:1.

16. The method of claim 15 wherein the mol ratio of B to A is about 2:1, and wherein the proportions of the components, on a water-free basis, are: A from about 15 to about 20%; B from about 25 to about 35%; C from about 2 to about 8%; D from about 2 to about 5%; E from about 15 to about 30%; and F from about 10 to about 15%, said percentages being by weight based on the combined weight of components A through F on a water-free basis.

17. The method of claim 15 wherein the mol ratio of B to A is about 2:1, and wherein the proportions of the components, on a water-free basis, are : A about 18–19%, B about 30–32%, C about 5–6%; D about 3—4%, E about 23–24%; and F about 13–14%, said percentages being by weight based on the combined weight of components A through F on a water-free basis.

18. The method of claim 14 wherein A is a sodium alphaolefin sulfonate which is a mixture containing principally 14 and 16 carbon atoms; wherein B is a mixture of stearic and palmitic acids; wherein E is sucrose; wherein F is diethylene glycol monobutyl ether; and wherein the mol ratio of potassium provided by C plus D to sodium provided by A is about 2:1.

19. The method of claim 18 wherein the mol ratio of B to A is about 2:1, and wherein the proportions of the components, on a water-free basis, are: A from about 15 to about 20%; B from about 25 to about 35%; C from about 2 to about 8%; D from about 2 to about 5%; E from about 15 to about 30%; and F from about 10 to about 15%, said percentages being by weight based on the combined weight of components A through F on a water-free basis.

20. The method of claim 18 wherein the mol ratio of B to A is about 2:1, and wherein the proportions of the components, on a water-free basis, are : A about 18–19%, B about 30–32%, C about 5–6%; D about 3—4%, E about 23–24%; and F about 13–14%, said percentages being by weight based on the combined weight of components A through F on a water-free basis.

21. The method of claim 14 wherein the mol ratio of B to A is about 2:1, and wherein the proportions of the components, on a water-free basis, are: A from about 15 to about 20%, B from about 25 to about 35%, C from about 2 to about 8%, D from about 2 to about 5%; E from about 15 to about 30%; and F from about 10 to about 15%, said percentages being by weight based on the combined weight of components A through F on a water-free basis.

22. The method of claim 14 wherein the mol ratio of B to A is about 2:1, and wherein the proportions of the components, on a water-free basis, are : A about 18–19%, B about 30–32%, C about 5–6%; D about 3—4%, E about 23–24%; and F about 13–14%, said percentages being by weight based on the combined weight of components A through F on a water-free basis.

23. The method of claim 14 wherein the concentration of components A through F by weight on a water-free basis is between about 1 and about 6%, based on the total weight of the composition.

24. The method of claim 14 wherein the concentration of components A through F by weight on a water-free basis is between about 3 and about 4%, based on the total weight of the composition.

25. The method of claim 14 wherein E is sucrose or urea.

26. The method of claim 14 wherein said composition includes potassium tripolyphosphate.

* * * * *

UNITED STATES PATENT AND TRADEMARK OFFICE
CERTIFICATE OF CORRECTION

PATENT NO. : 5,215,786
DATED : June 1, 1993
INVENTOR(S) : Paul J. Kittle It is certified that error appears in the above-identified patent and that said Letters Patent is hereby corrected as shown below:

Column 6, line 32 "D" should be -- C --.

Signed and Sealed this

Eleventh Day of January, 1994

Attest:

BRUCE LEHMAN

*Attesting Officer*  *Commissioner of Patents and Trademarks*